United States Patent [19]

Grube

[11] Patent Number: 4,722,657
[45] Date of Patent: Feb. 2, 1988

[54] PROCESS AND APPARATUS FOR TRANSPORTING AND STORING BOBBINS, ESPECIALLY FOR REMOVING THEM FROM AUTOMATIC SPINNING MACHINES OR THE LIKE

[75] Inventor: Erwin Grube, Bielefeld, Fed. Rep. of Germany

[73] Assignee: Durkoppwerke GmbH, Bielefeld, Fed. Rep. of Germany

[21] Appl. No.: 846,101

[22] Filed: Mar. 31, 1986

[30] Foreign Application Priority Data

Apr. 11, 1985 [DE] Fed. Rep. of Germany ....... 3513003

[51] Int. Cl.$^4$ ........................................... B65H 67/00
[52] U.S. Cl. .................................. 414/331; 414/283; 414/911; 414/665; 414/222; 414/744 R; 414/684; 414/641; 242/58.6; 242/79; 211/1.5; 104/49; 104/118
[58] Field of Search ................. 104/49, 118; 414/331, 414/282, 283, 277, 281, 908, 910, 911, 665, 669, 222, 223, 744 R, 786, 564, 748, 684, 641; 242/58.6, 79, 58; 211/1.5

[56] References Cited

U.S. PATENT DOCUMENTS

| | | | |
|---|---|---|---|
| 2,718,972 | 9/1955 | Temple | 414/331 X |
| 2,755,950 | 7/1956 | Forshey | 414/281 X |
| 3,499,554 | 3/1970 | Davis et al. | 414/283 |
| 3,526,330 | 9/1970 | Armington et al. | 414/665 |
| 3,695,539 | 10/1972 | Lindstaedt | 242/79 X |
| 3,863,778 | 2/1975 | Martin, Sr. | 414/331 |
| 4,131,206 | 12/1978 | Kawada et al. | 414/911 X |
| 4,331,230 | 5/1982 | Buckley | 414/331 X |
| 4,406,570 | 9/1983 | Duncan et al. | 414/911 X |
| 4,555,215 | 11/1985 | Raasch et al. | 414/331 X |

FOREIGN PATENT DOCUMENTS 2124159 2/1984 United Kingdom .

OTHER PUBLICATIONS

IBM Technical Disclosure Bulletin—vol. 22, No. 4—Sep. 1979, p. 1364.

Primary Examiner—Frank E. Werner
Attorney, Agent, or Firm—Oblon, Fisher, Spivak, McClelland & Maier

[57] ABSTRACT

In apparatus for transporting and storing bobbins, especially for removing them from automatic spinning machines, the bobbins are received and collected in an inclined collecting chute from a conveyor belt, are then brought into a horizontal arrangement as a result of the pivoting of the collecting chute, and are pushed in groups from the collecting chute into a transfer chute. A conveyor carrier belonging to a suspension conveyor and provided with at least one chute portion for receiving a group of bobbins is brought into a position adjacent to the transfer chute. The transfer chute is moved into a position located next to the chute portion of the conveyor carrier, and the bobbins are transferred into the chute portion of the conveyor carrier. The bobbins are subsequently moved into a desired target position by means of the conveyor carrier.

8 Claims, 25 Drawing Figures 4,722,657

PROCESS AND APPARATUS FOR TRANSPORTING AND STORING BOBBINS, ESPECIALLY FOR REMOVING THEM FROM AUTOMATIC SPINNING MACHINES OR THE LIKE

FIELD OF THE INVENTION

The invention relates to apparatus for transporting and storing bobbins, especially for removing them from automatic spinning machines or the like, in which the bobbins are received and collected in an inclined collecting chute from a conveyor belt, are then brought into a horizontal arrangement as a result of the pivoting of the collecting chute, and are pushed in groups from the collecting chute into a transfer chute.

BACKGROUND OF THE INVENTION

Apparatus of this type is described in the applicant's older patent application Ser. No. 808,050. In this apparatus, the finished bobbins roll down on a chute-like inclined roller conveyor from a conveyor belt on the top side of an automatic spinning machine. One portion of the roller conveyor can be pivoted into a horizontal position, in which the collected bobbins can be transferred by means of a slide into a transfer chute which can be raised and lowered vertically. The transfer chute can be brought level with the individual compartments of a magazine trolley and tilted about their longitudinal axis, in such a way that the bobbins roll into the compartments in the magazine trolley.

Although this apparatus has proved successful as an additional unit for automatic spinning machines, it is nevertheless unsuitable for many uses. Magazine trolleys of the conventional type make it more difficult to automate the transport and removal of the bobbins.

To limit the costs of yarn production, special machines with maximum production capacity have been used in the textile industry, but these have to be operated in three shifts because of the high investment costs. Standstill times are therefore highly undesirable. However, as before, it is impossible to avoid interruptions in operation, if only because there are still no devices available for continuous and largely automatic removal (that is to say, extraction) of the finished yarn bobbins.

It becomes more difficult to automate the removal operation, among other things, because the finished bobbins can differ greatly from one another in terms of size, build-up and weight and, furthermore, in terms of the type of tubes used.

OBJECT OF THE INVENTION

The object on which the invention is based is to provide apparatus which can be used universally which make is possible, by means of standard process steps and a relatively small number of components, to remove bobbins from different production machines, transport the bobbins to any target positions, and, if appropriate, also store them.

SUMMARY OF THE INVENTION

According to the invention, this object is achieved because a movable conveyor carrier having at least one chute portion for receiving a group of bobbins is brought into a position adjacent to the transfer chute, because the transfer chute is moved into a position which is next to the chute portion and in which the bobbins are transferred into the chute portion of the conveyor carrier, and because the bobbins are subsequently moved into a desired target position by means of the conveyor carrier.

The apparatus according to the invention differs from the apparatus described in the introduction, essentially in that movable conveyor carriers of a suspension conveyor are provided as a receiving and transport device for the bobbins, and the transfer chute is pivotable about a vertical axle and/or is movable in a horizontal direction.

Since the transfer chute can not only be raised and lowered, but also be moved in the horizontal direction, it offers the possibility of transferring the bobbins from the collecting chute into the chute portion of the conveyor carrier along virtually any path. Moreover, after a transfer operation, the transfer chute can be moved upwards out of regions possibly required for other operations. It can be used as a transfer means in any position during the handling of bobbins.

Conveyor carriers in the form of so-called trolleys of a suspension conveyor are a flexible, spacesaving conveying means which can be used in an extremely versatile manner and which need be adapted to the task of receiving the bobbin groups merely by providing it with one or preferably several chute portions located above one another. These conveyor carriers can perform any transport tasks and, furthermore, can be used for the storage of bobbins.

The transfer chute is preferably mounted on a movable stand having a vertical mast so as to be vertically adjustable and so as to be pivotable about a vertical axle located at one end of the chute. The movable stnad, for example running on rollers, allows the transfer chute to be used in any transfer positions. Moreover, the transfer chute is preferably tiltable about an axle parallel to its longitudinal axis, so that the bobbins can be transferred as a result of the tilting of the transfer chute. Finally, the transfer chute can have devices which bring the bobbins to predetermined longitudinal distances between them, as already described in the applicant's application mentioned in the introduction.

The conveyor carriers usually have several chute portions which are located above one another and which are suspended at both ends on vertical frames of the conveyor carrier. In the region of the upper ends of the frames, track rollers are provided for supporting the chute portions on rails of a suspension-conveyor system. The chute portions can be connected pivotably to the vertical frames by means of horizontal axles directed transversely relative to the running direction, so that the entire conveyor carrier changes shape in the manner of a parallelogram over ascending or descending gradients. In this way, the height assumed by the conveyor carrier underneath the running rails remains essentially unchanged where there are gradients. Moreover, the conveyor carrier can be designed so as to be pivotable about a vertical axle in relation to a separate undercarriage.

Preferred exemplary embodiments of the invention are explained in detail below with reference to the attached drawing.

DETAILED DESCRIPTION OF THE PREFERRED EMBODIMENTS

Figure 1:
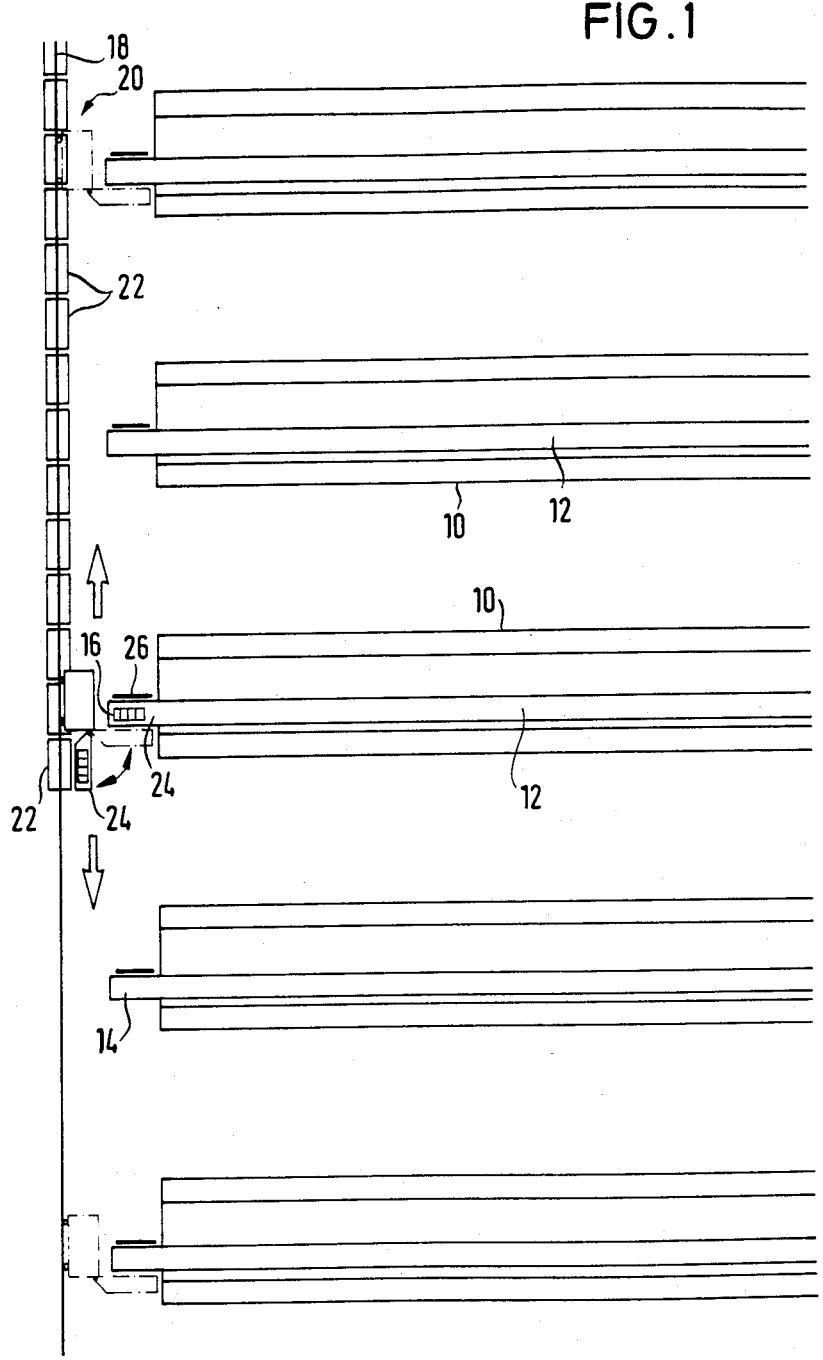
FIG. 1 is a diagrammatic plan view of an installation with a series of automatic spinning machines and of a removal apparatus according to the invention with a suspension conveyor and a transfer chute.

FIG. 1 shows a number of automatic spinning machines 10 with a large number of spinning stations (not shown), from which finished bobbins are automatically delivered onto a conveyor belt 12 extending over the top side of the automatic spinning machine 10. This conveyor belt 12 runs to the end of the automatic spinning machine 10 shown on the left in FIG. 1 and there changes into a collecting chute 14 which is inclined downwards to the left in FIG. 1, so that the arriving bobbins 16 each slide down to the left-hand end and are collected there.

A rail 18 of a suspension conveyor 20 extends along the end faces of the automatic spinning machine 10. According to FIG. 1, a number of conveyor carriers 22 has been provided on the rail 18. FIG. 1 shows, at mid-height between the rail 18 of the suspension conveyor and one of the automatic spinning machines 10, a transfer chute 24 which is pivotable between the position represented by dot-and-dash lines and the position shown by unbroken lines. In the position indicated by dot-and-dash lines, the transfer chute 24 is located laterally next to the collecting chute 14, so that the bobbins 16 can be pushed over on to the transfer chute 24 by means of a slide 26. The collecting chute 14 is first pivoted into a horizontal position, as will be explained later. In the position of the transfer chute 24 shown by unbroken lines, it is located laterally next to one of the conveyor carriers 22, so that the bobbins 16 can be transferred onto the conveyor carrier 22, for example as a result of the lateral tilting of the transfer chute 24, as will also be explained later.

Figure 2:
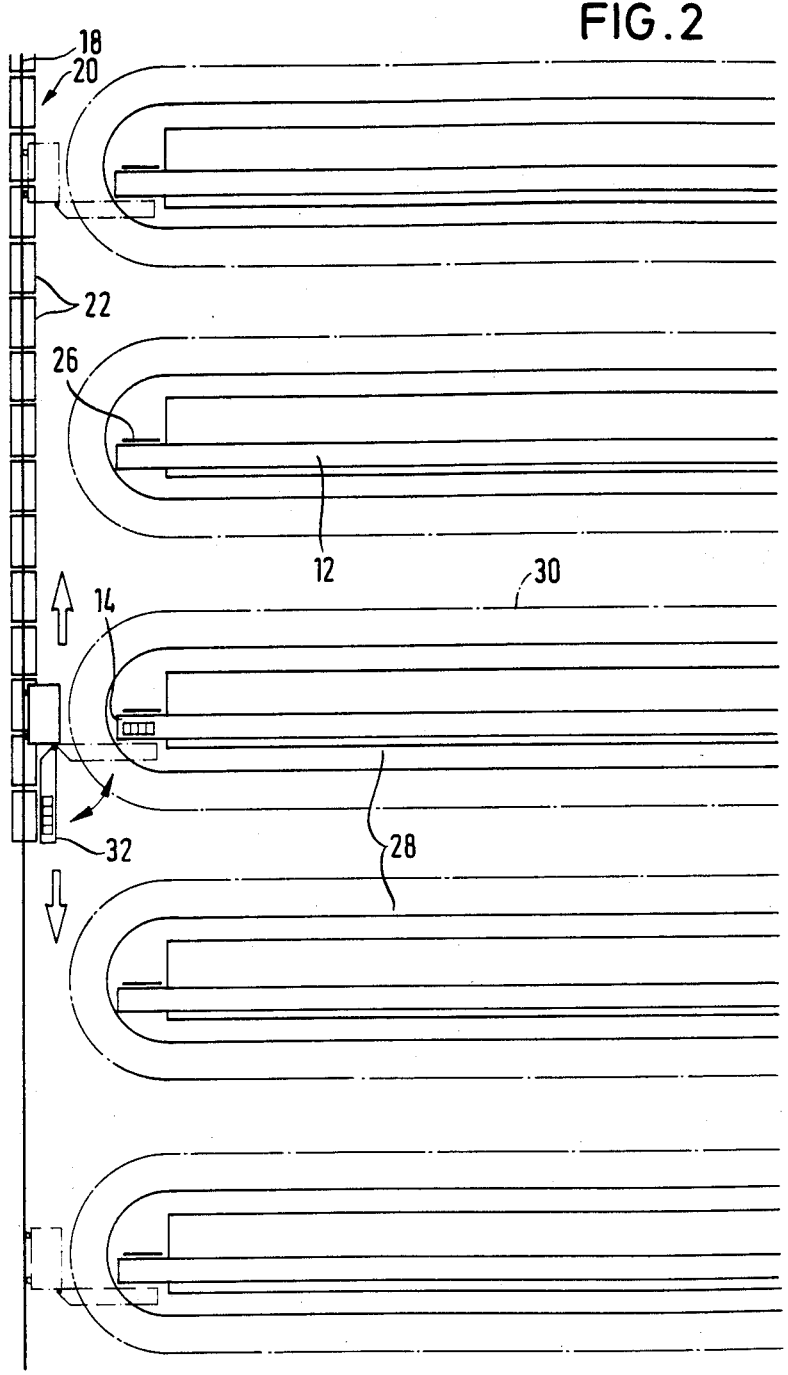
FIG. 2 shows a corresponding plan view of a series of automatic spinning machines with a piecing trolley.

FIG. 2 shows a number of automatic spinning machines 28 which correspond essentially to the above-mentioned automatic spinning machines 10, but which are provided with a piecing trolley (not shown) which is movable along both sides of the automatic spinning machine 28 and which, during this movement, follows with its outer contours the path 30 represented by dot-and-dash lines. To allow for this movement of the piecing trolley, the transfer chute, designated here by 32, is made longer, so that, in the position, represented by unbroken lines, adjacent to one of the conveyor carriers 22, it does not impede the movement of the piecing trolley, but can nevertheless be pivoted beyond the path of the latter to a point next to the collecting chute 14.

Figure 3:
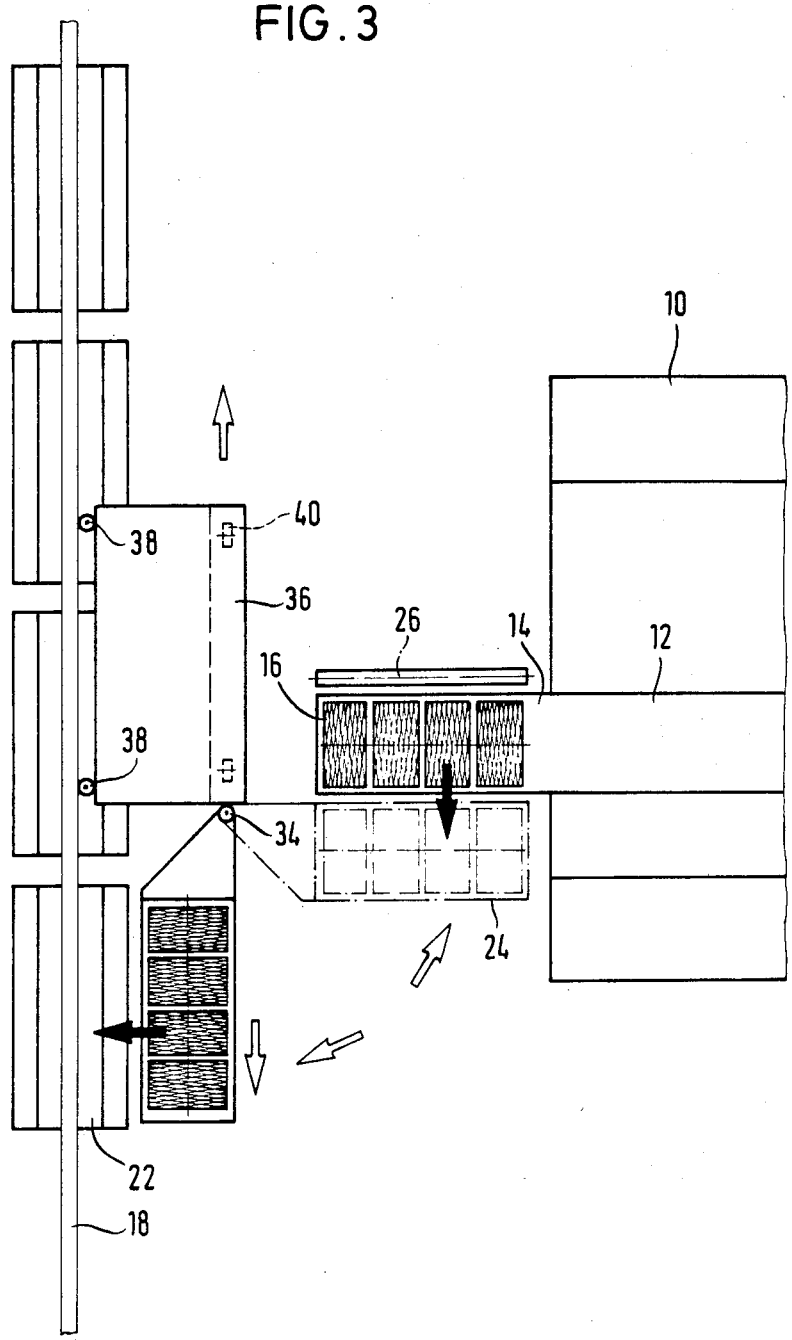
FIG. 3 is an enlarged partial representation of FIG. 1.

FIG. 3 is an enlarged partial plan view of FIG. 1, so essentially the same reference numerals can be used and there is no need for a detailed explanation. The transfer chute 24 is mounted pivotably on a vertical axle 34 near one of its ends. This axle 34 is fastened to a movable stand 36 which, in the example illustrated, is supported on rails (not shown) and is movable on these by means of upper rollers 38 with a vertical axis of rotation and lower rollers 40 with a horizontal axis of rotation.

Figure 4:
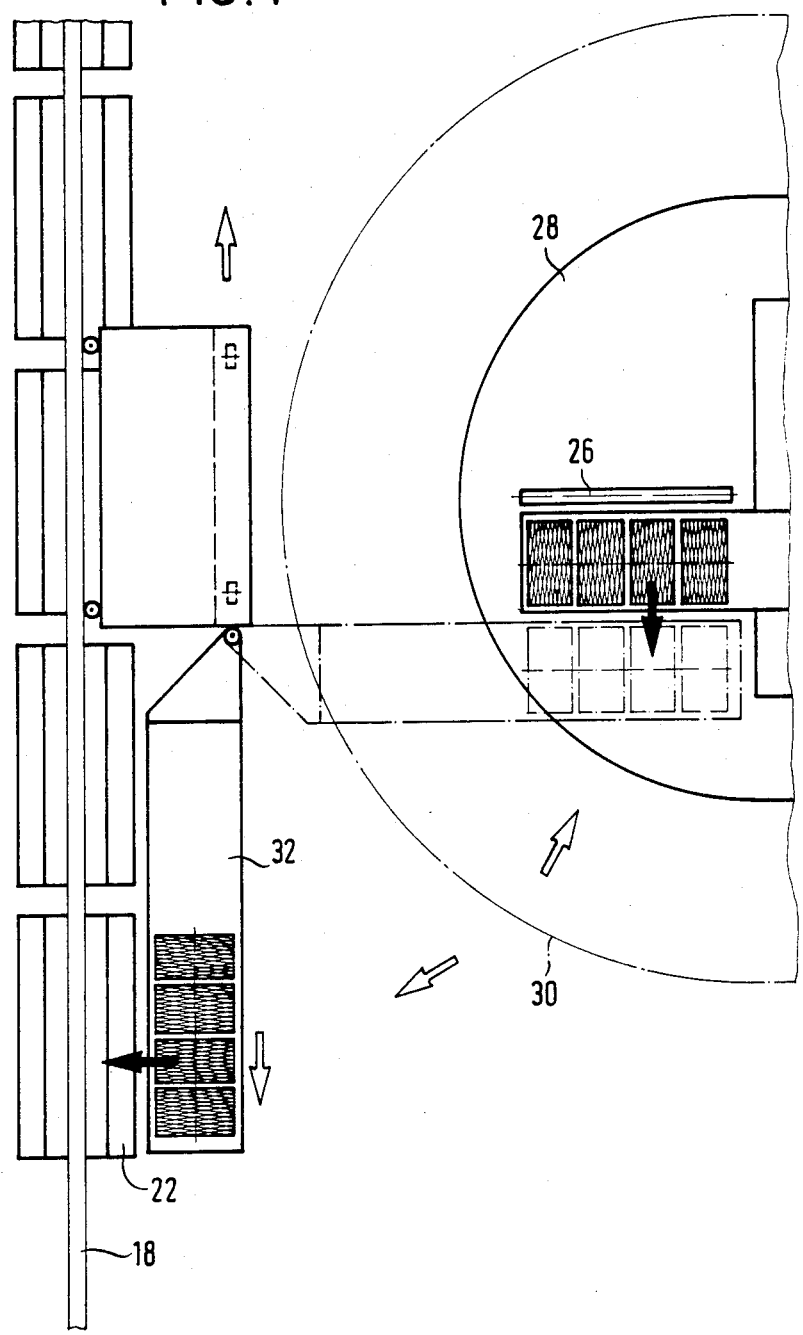
FIG. 4 is an enlarged partial representation of FIG. 2.

FIG. 4 is a corresponding partial representation of FIG. 2 and shows the lengthened transfer chute 32 and the path 30 of the piecing trolley.

Figure 5:
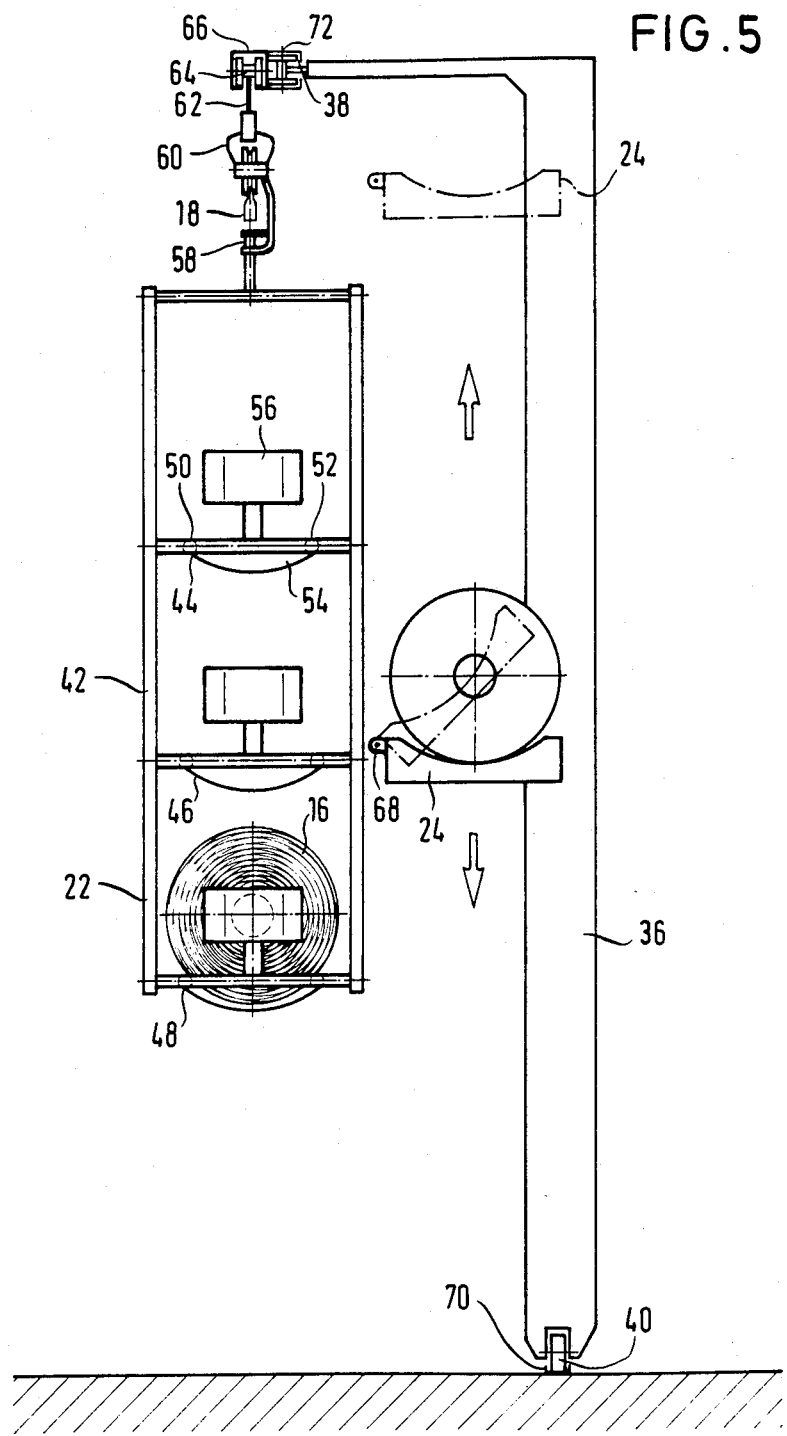
FIG. 5 shows a view of a transfer chute guided on a mast and of a conveyor carrier.

FIG. 5 shows a diagrammatic side view of a conveyor carrier 22 and of the movable stand 36 with a transfer chute 24. The conveyor carrier 22 has vertical ladder-shaped front and rear frames 42 which, in the example illustrated, carry three chute portions 44, 46, 48 located above one another for bobbins 16. In the example shown, the chute portions 44, 46, 48 are formed by two lateral longitudinally directed rods 50, 52 between the two end frames 42 and by a cloth 54 which is stretched so as to sag between the rods 50, 52 and which makes it possible to receive bobbins 16 of different dimensions. Adjustable retaining plates 56 prevent the bobbins 16 from slipping in the longitudinal direction of the chute portions 44, 46, 48.

Fastened on the top side of the frames 42 are roller-holders 58 carrying rotatable rollers 60 which run on the rails 18. A pawl 62 projects upwards from the roller-holders 58 and can be engaged with a drag chain 64 moved in a guide 66.

The transfer chute 24 is movable in the vertical direction on the movable stand 36, as indicated in FIG. 5 by the arrows not bearing reference symbols. In this way, the transfer chute 24 can be brought level with the collecting chute 14, on the one hand, and level with the chute portions 44, 46, 48 of the conveyor carrier 22, on the other hand. The transfer chute 14 can also be lifted into the position of rest indicated by dot-and-dash lines in the upper region of FIG. 5, to prevent it from impeding the movement of the conveyor carriers 22 having a pendulum suspension and from injuring the attendance crew by crushing them between the conveyor carrier 22 and the transfer chute 24. The transfer chute 24 also has, on one lateral edge, a tilting axle 68 parallel to its longitudinal direction, so that the transfer chute 24 can be tilted into the position shown by dot-and-dash lines in FIG. 5, in which the bobbins 16 are discharged and roll into the associated chute portion 46 of the conveyor carrier 22. In this case, the conveyor carrier 22 and the transfer chute 24 can be coupled in a way not shown, so that the conveyor carrier 22 does not move away sideways during the transfer movement.

It also emerges from FIG. 5 that the movable stand 36 is guided on the floor in rails 70 by the lower rollers 40 and in the upper region by rails 72.

Figure 6:
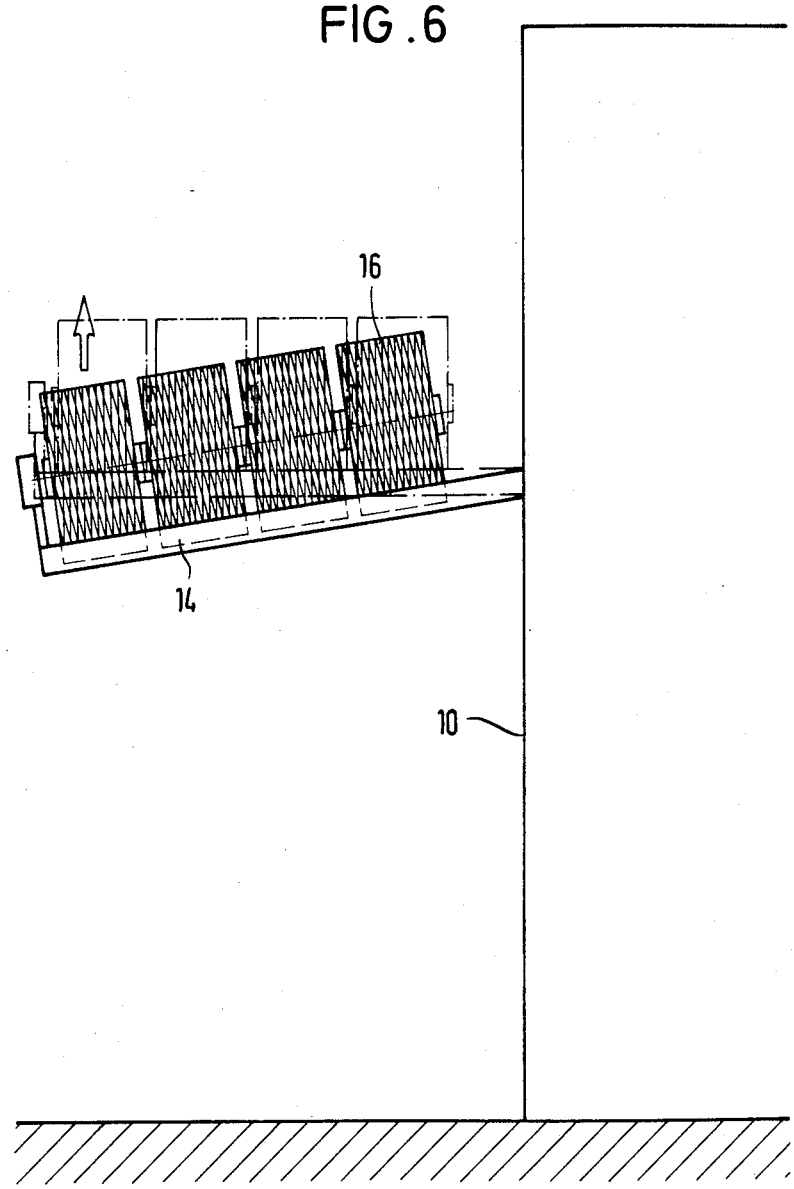
FIG. 6 is a lateral representation of a collecting chute of an automatic spinning machine.

FIG. 6 serves to illustrate the collecting chute 14 on the automatic spinning machine 10. This collecting chute 14, for example a chute-like roller conveyor, is inclined downwards, so that the bobbins 16 each slide to the left-hand end and are collected resting against one another, as shown in FIG. 6 by the example of four bobbins. The collecting chute 14 can be lifted into the horizontal position shown by dot-and-dash lines, so that transfer onto the transfer chute 24 or 32 can take place.

Figure 7:
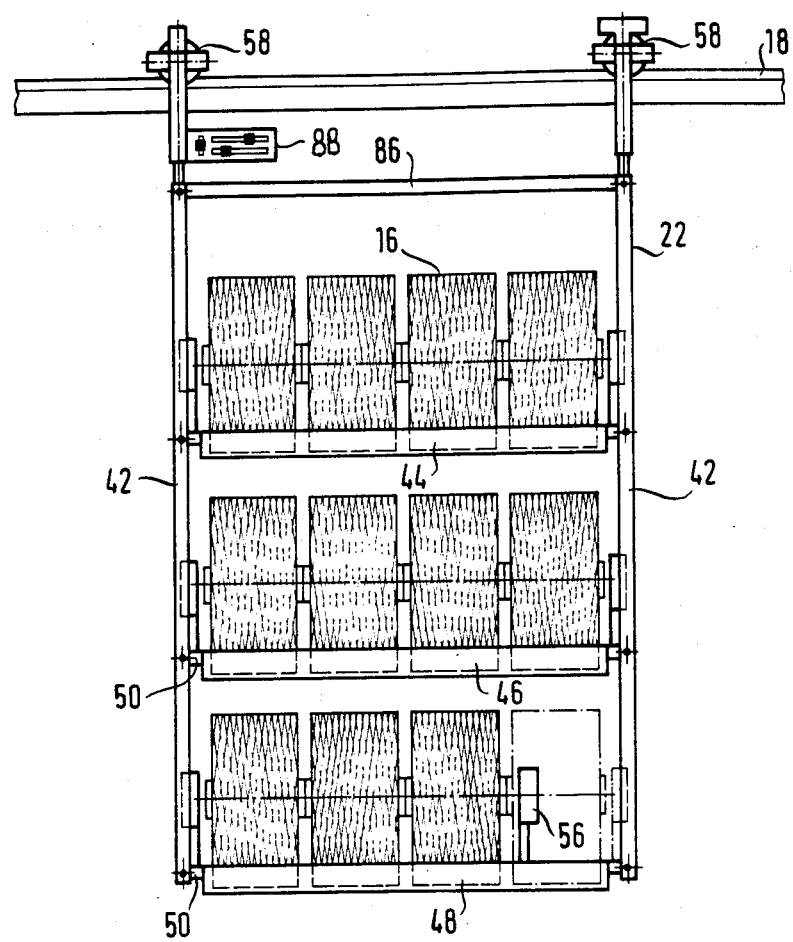
FIG. 7 is a view of a conveyor carrier with a number of bobbins.
Figure 8:
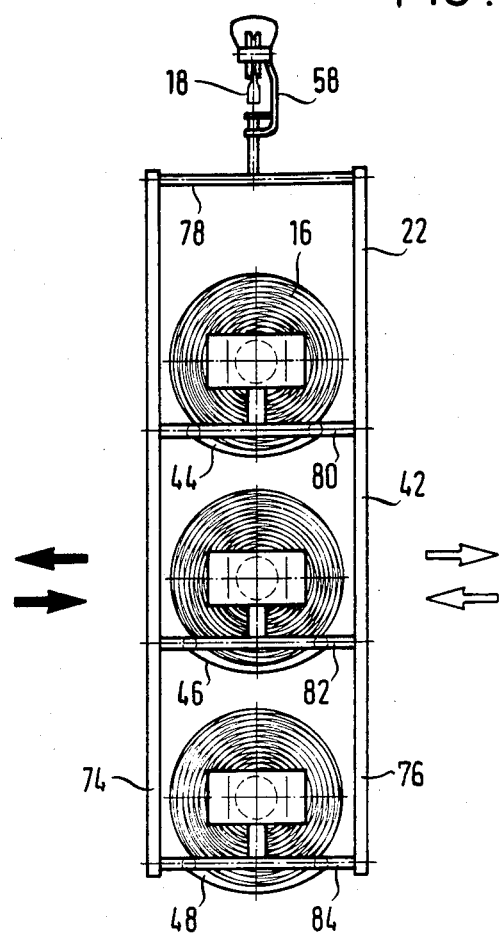
FIG. 8 is an associated end view.
Figure 9:
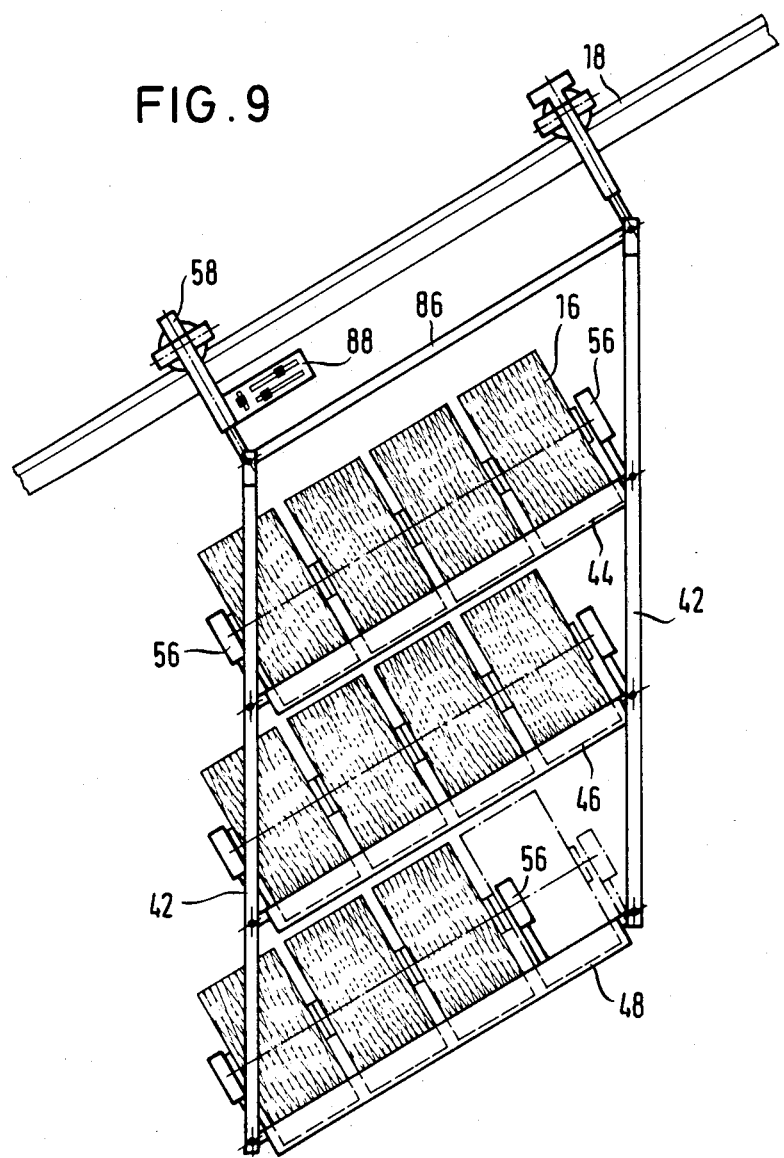
FIG. 9 shows the conveyor carrier of FIG. 7 on a gradient.

FIGS. 7 and 8 show a conveyor carrier 22 filled with bobbins 16 in two views perpendicular to one another. For explanatory purposes, reference can largely be made to the information relating to FIG. 5. The two ladder-shaped frames 42 on the end faces of the conveyor carrier have vertical struts 74, 76 and transverse rungs 78, 80, 82, 84. The vertical struts 74, 76 are connected to one another at their top ends by means of a longitudinal strut 86. In the exemplary embodiment shown in FIGS. 7 to 9, it will be assumed that the vertical struts 74, 76 are connected in an articulated manner to the transverse struts 78, 80, 82, 84 or the longitudinal strut 86 in horizontal transverse axes not designated, so that over ascending and descending gradients the conveyor carrier assumes the parallelogram-like shape illustrated in FIG. 9. This change in shape of the conveyor carrier 22 results in a reduction in the free height required underneath the rails 18. In the region of gradients, the bobbins 16 are retained on the end faces by the adjustable retaining plates 56 already mentioned.

One of the roller-holders 58 according to FIG. 7 carries a coding plate 88, on which, for example, a code which can be read off automatically can be set for a specific target station.

Figure 10:
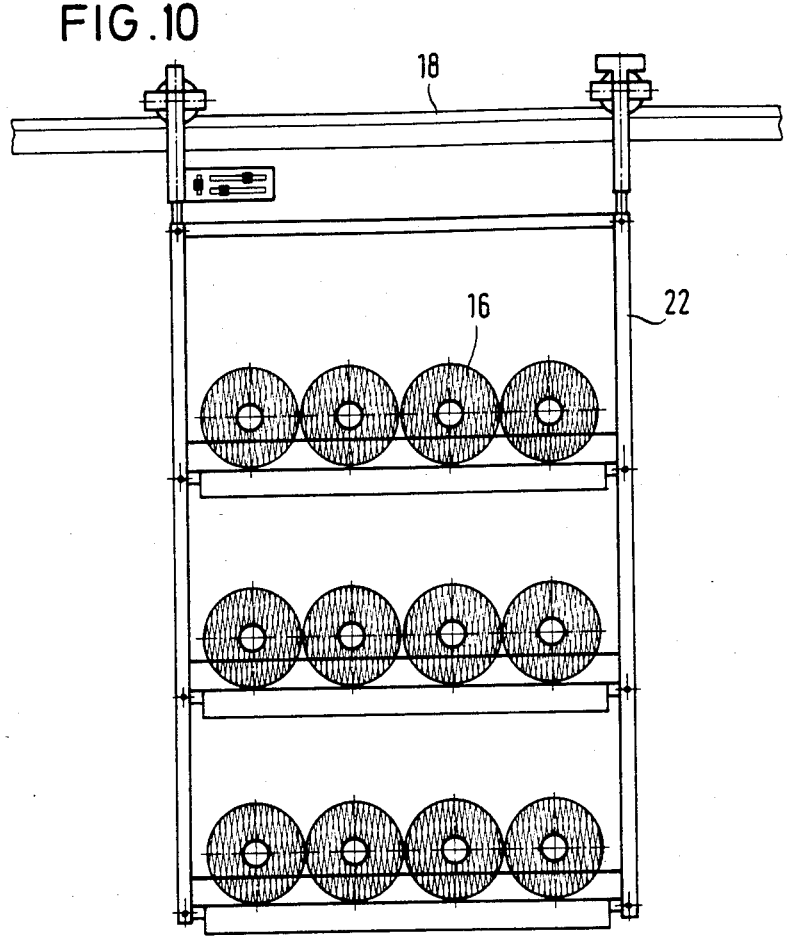
FIG. 10 shows a conveyor carrier with a number of bobbins arranged in the transverse direction.
Figure 10:
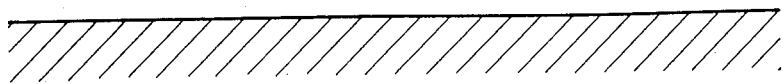

FIG. 10 largely corresponds to FIG. 7 and therefore will not be explained in detail, but it illustrates the arrangement of bobbins 16 with transversely directed bobbin axes.

Figure 11:
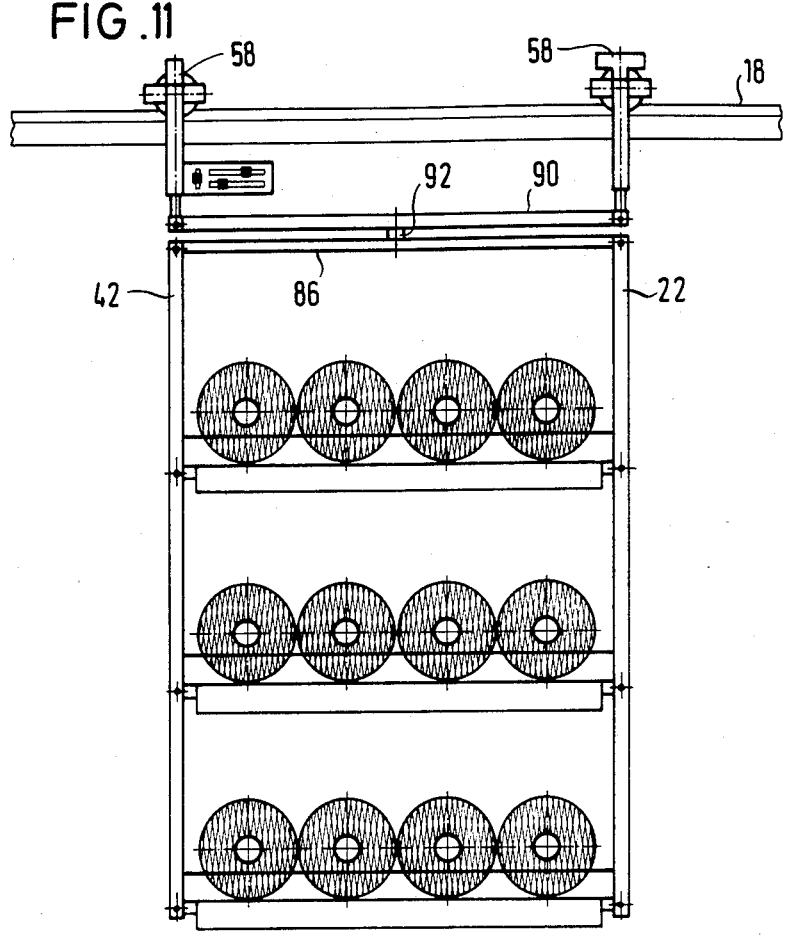
FIG. 11 is a view of a conveyor carrier rotatable about the vertical axis.
Figure 12:
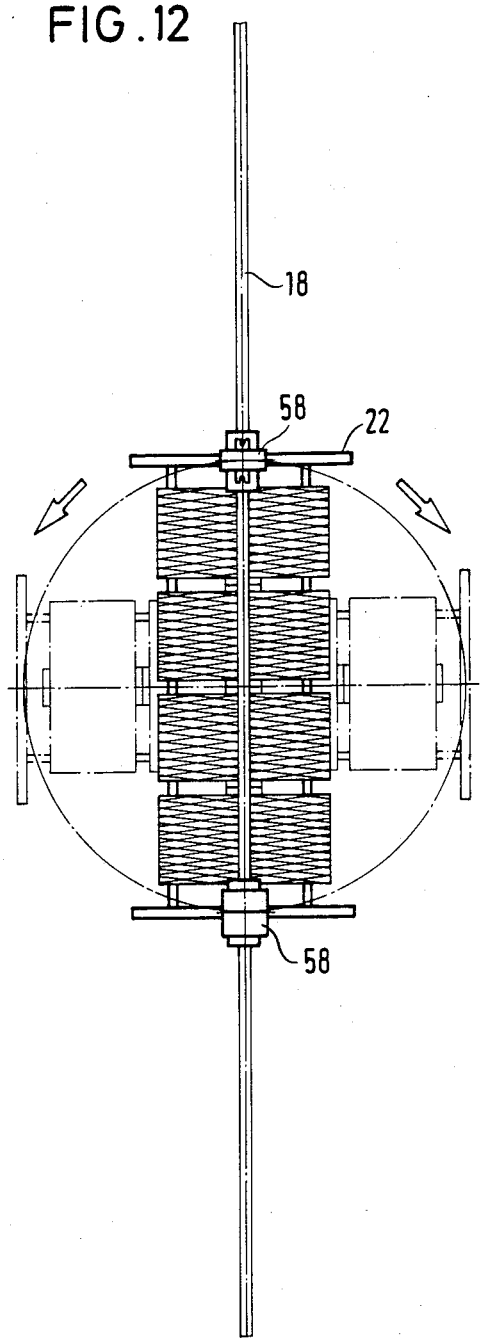
FIG. 12 is a plan view of FIG. 11.

According to FIG. 11, the roller-holders 58 are connected to one another by means of a separate longitudinal strut 90, and the longitudinal strut 90 is connected in its middle region to the longitudinal strut 86 at the upper end of the frame 42 by means of a vertical axle 92. In this way, the lower part of the conveyor carrier 22 can be rotated about a vertical axis, as illustrated in FIG. 12. This allows additional coordination with different removal or loading directions.

Figure 13:
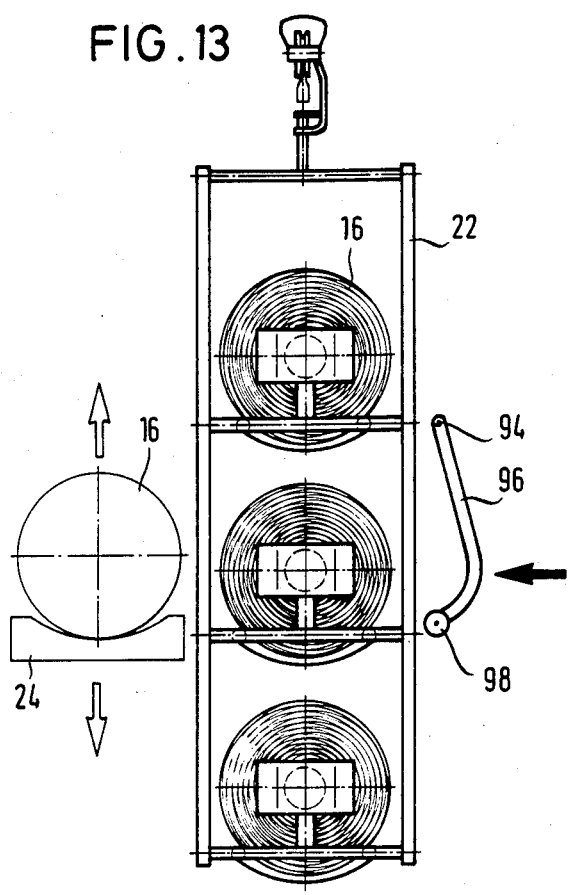
FIG. 13 shows a conveyor carrier with a slide for ejecting bobbins and a transfer chute.

FIG. 13 shows, in a position at the side of a conveyor carrier 22, a slide 98 which is pivotable about an axle 94 on levers 96 and by means of which bobbins 16 can be pushed out of the conveyor carrier 22, for example onto a transfer chute shown on the left in FIG. 13. According to FIG. 14, the transfer chute 24 can be located between two conveyor carriers 22 and can serve to transfer bobbins 16 from the first conveyor carrier 22 to the second. This arrangement, by lifting and lowering the transfer chute 24 and moving the receiving conveyor carrier on the associated rails, makes it possible to sort different bobbins 16 in groups.

Figure 15:
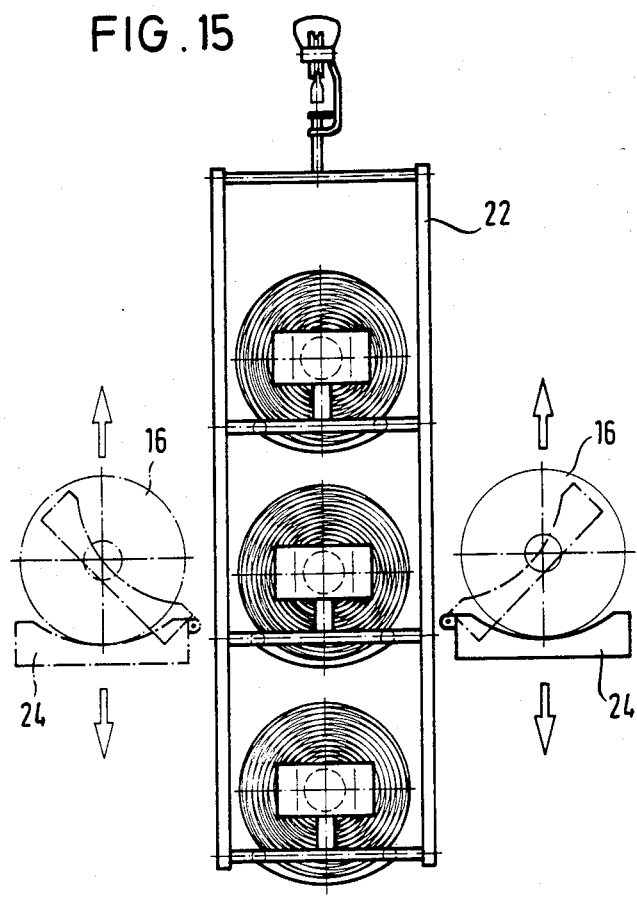
FIG. 15 illustrates the use of the transfer chute on both sides of a conveyor carrier.

It emerges from FIG. 15 that a conveyor carrier 22 can be loaded with bobbins 16 from both sides in the same way by means of transfer chutes 24.

Figure 14:
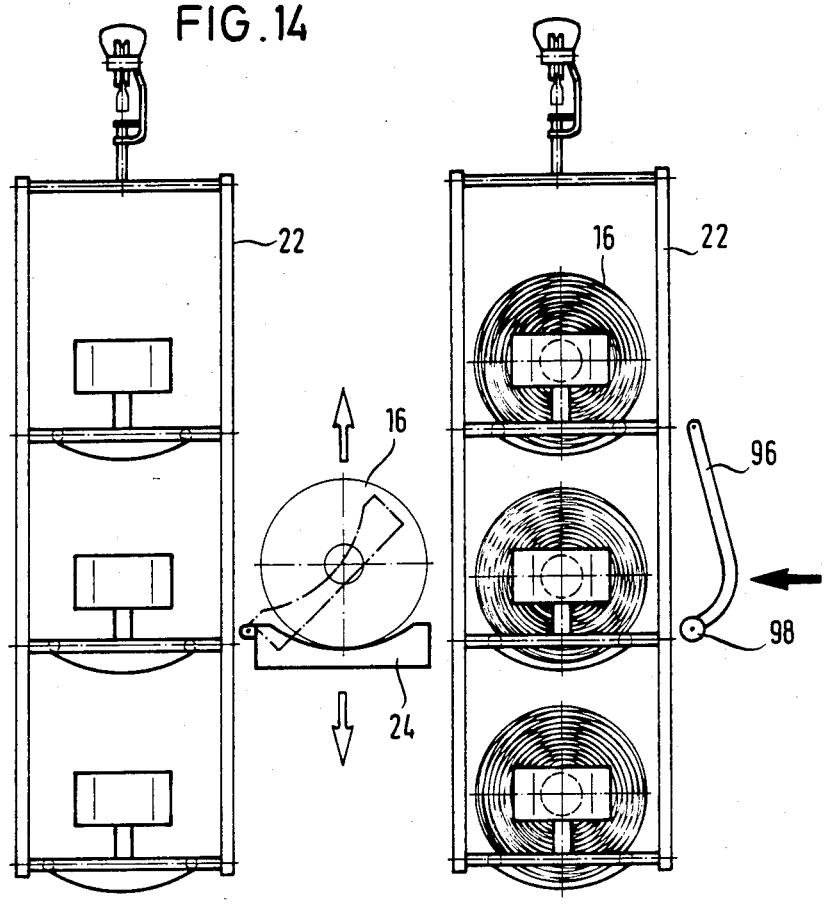
FIG. 14 illustrates the use of the transfer chute between two conveyor carriers.
Figure 16:
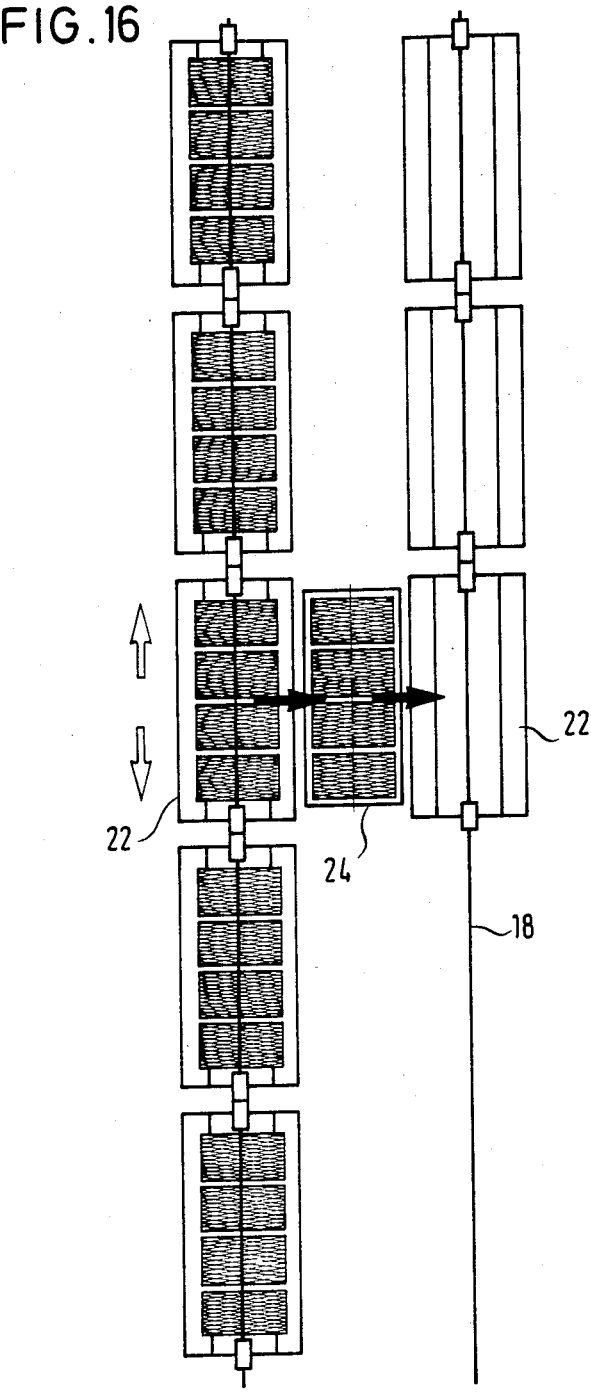
FIG. 16 shows a plan view of a transfer chute between two conveyor carriers.
Figure 17:
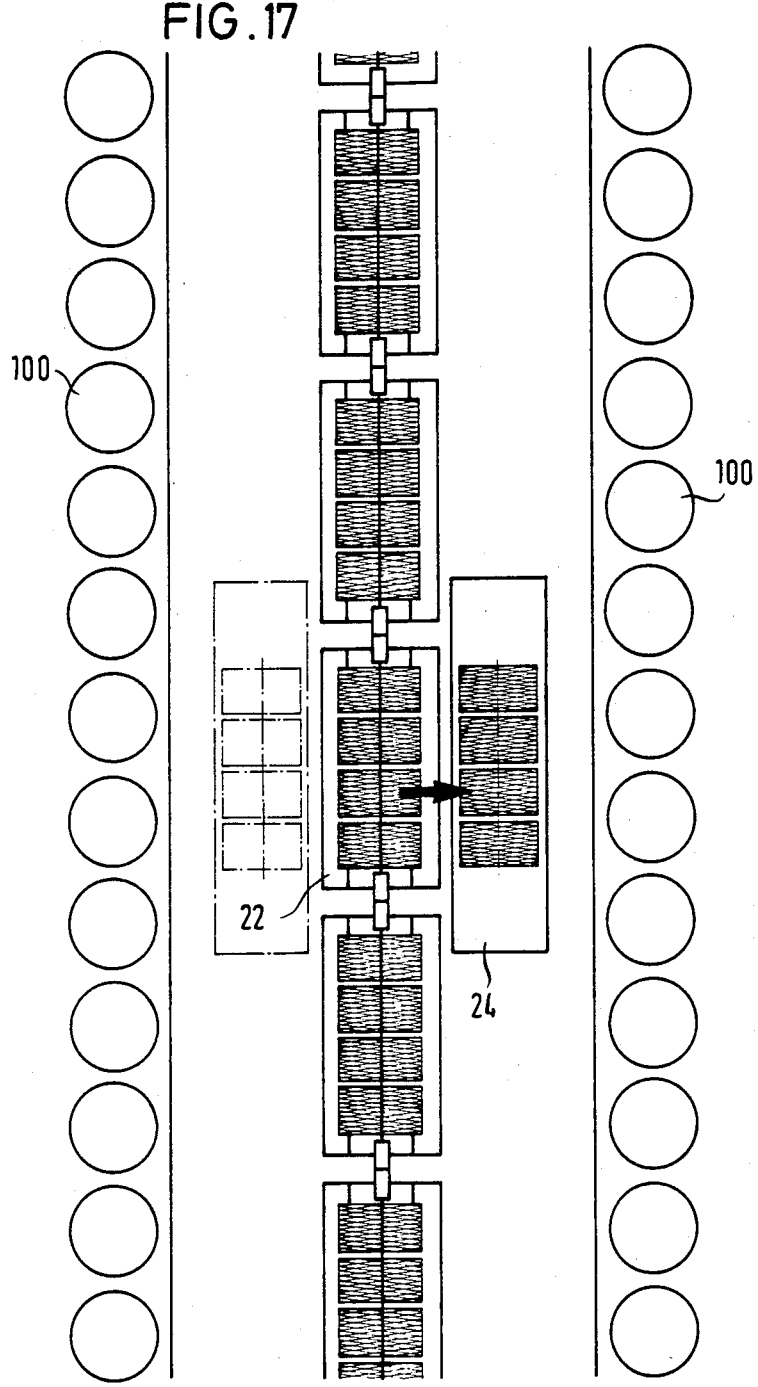
FIG. 17 illustrates the use of a transfer chute during the transfer from a conveyor carrier to a processing machine.
Figure 18:
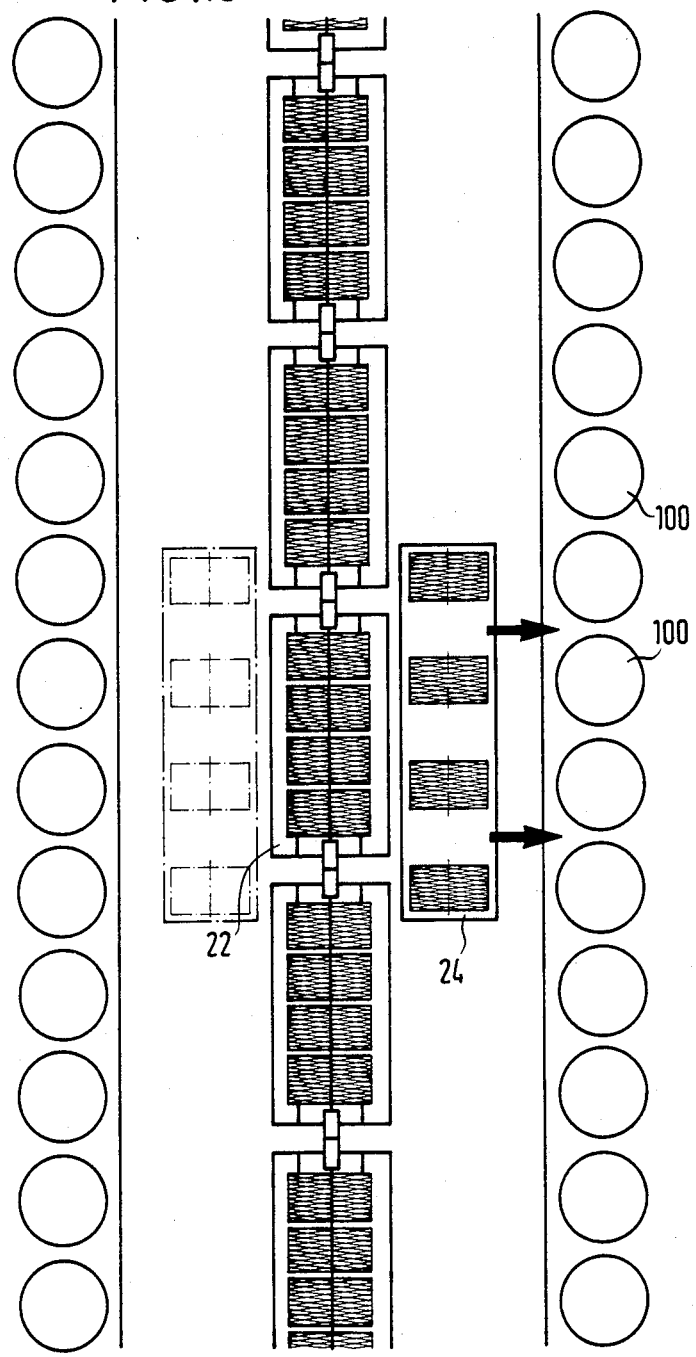
FIG. 18 shows a plan view of a conveyor carrier and a transfer chute, on which the bobbins have been brought with predetermined distances between them.
Figure 19:
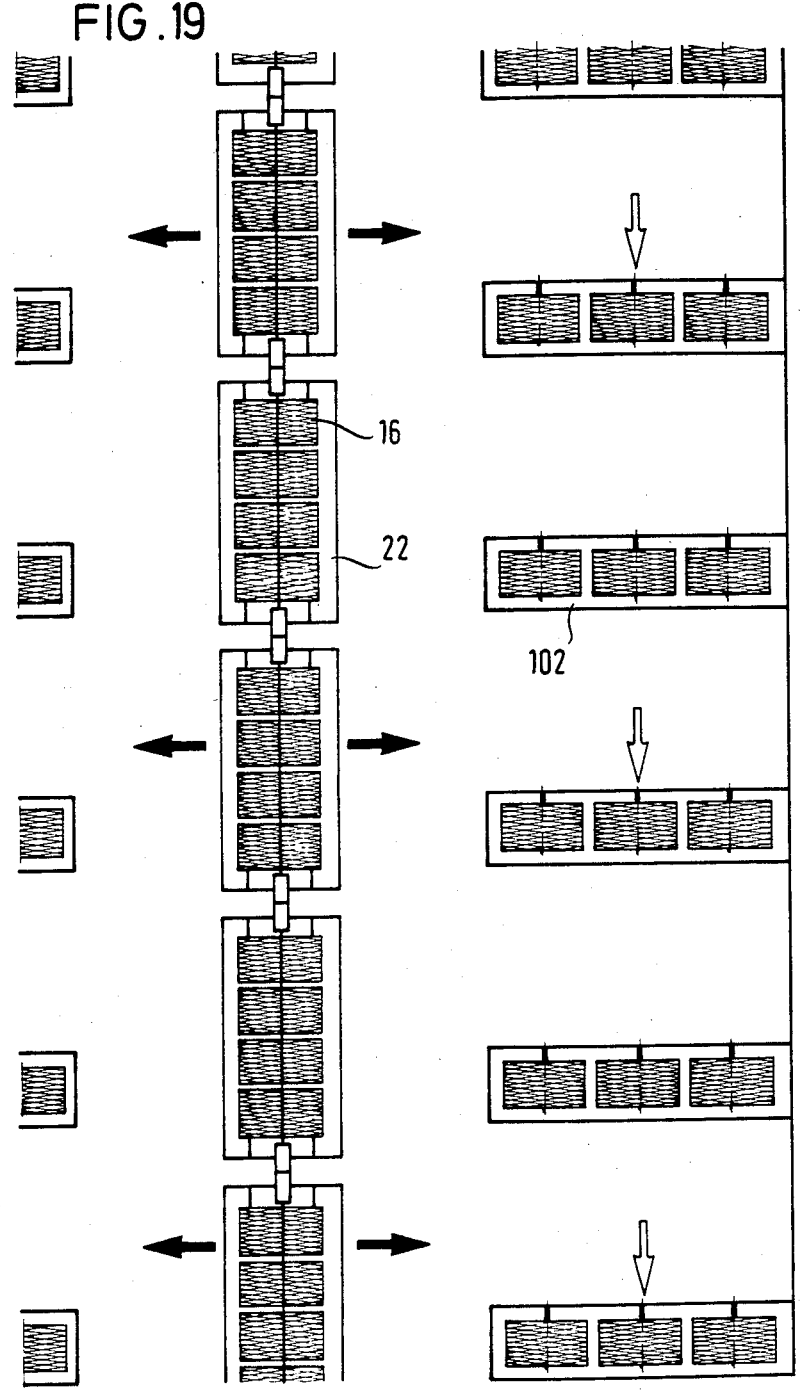
FIG. 19 shows the possibility of removing bobbins from a conveyor carrier by hand and depositing them in predetermined positions.

FIG. 16 is essentially a plan view of FIG. 14 and accordingly shows the transfer of bobbins 16 between two suspension-conveyor lines by means of a transfer chute 24. According to FIGS. 17 and 18, bobbins 16 are transferred from a conveyor carrier 22 on to a transfer chute 24 and on the latter are brought to suitable longitudinal distances from one another for a number of following processing stations 100. According to FIG. 19, bobbins 16 can also be removed from the conveyor carriers 22 by hand and introduced into processing stations 102. As regards a suspension conveyor guided at the customary height and chute portions in a conveyor carrier which are, for example, located above one another, all the bobbins 16 are at a favourable grasping height for a person employed in removing them.

Figure 20:
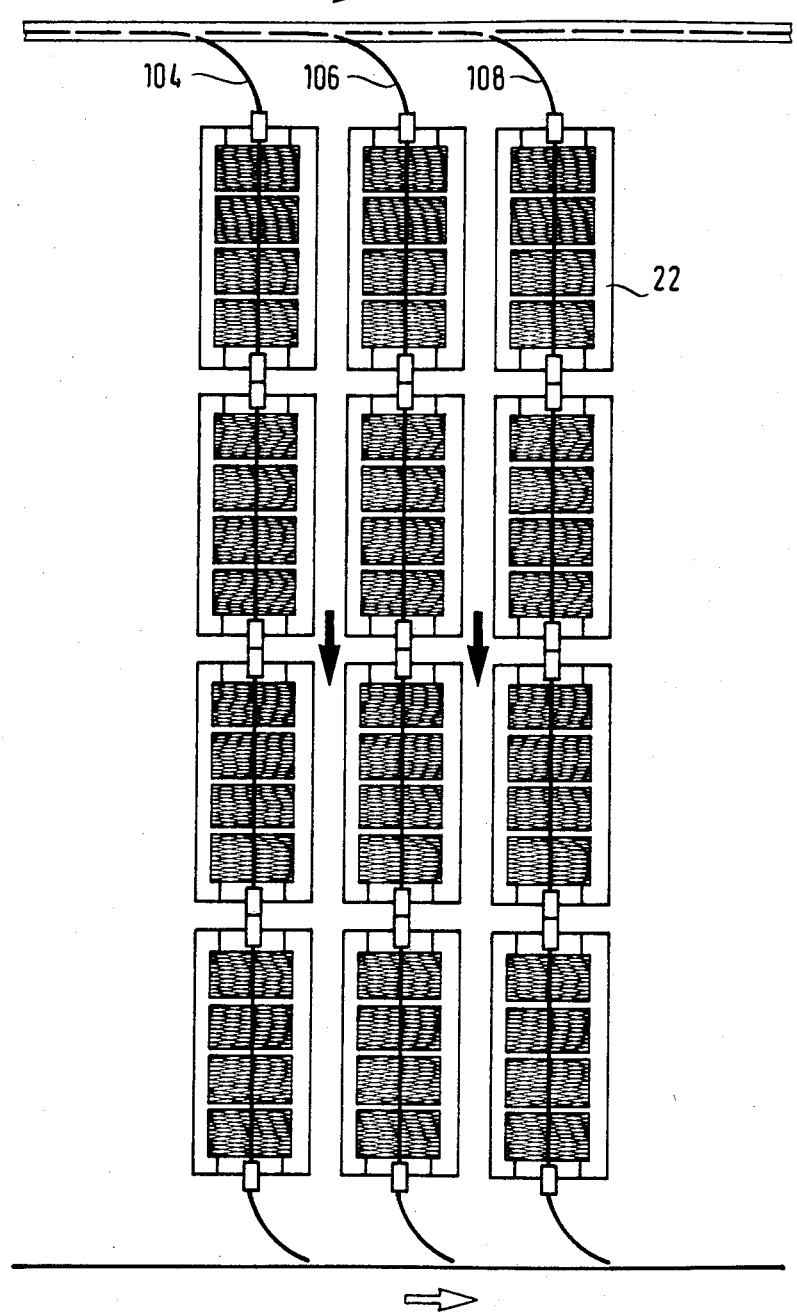
FIG. 20 is a plan view of a buffer station or a store for conveyor carriers with bobbins.
Figure 21:
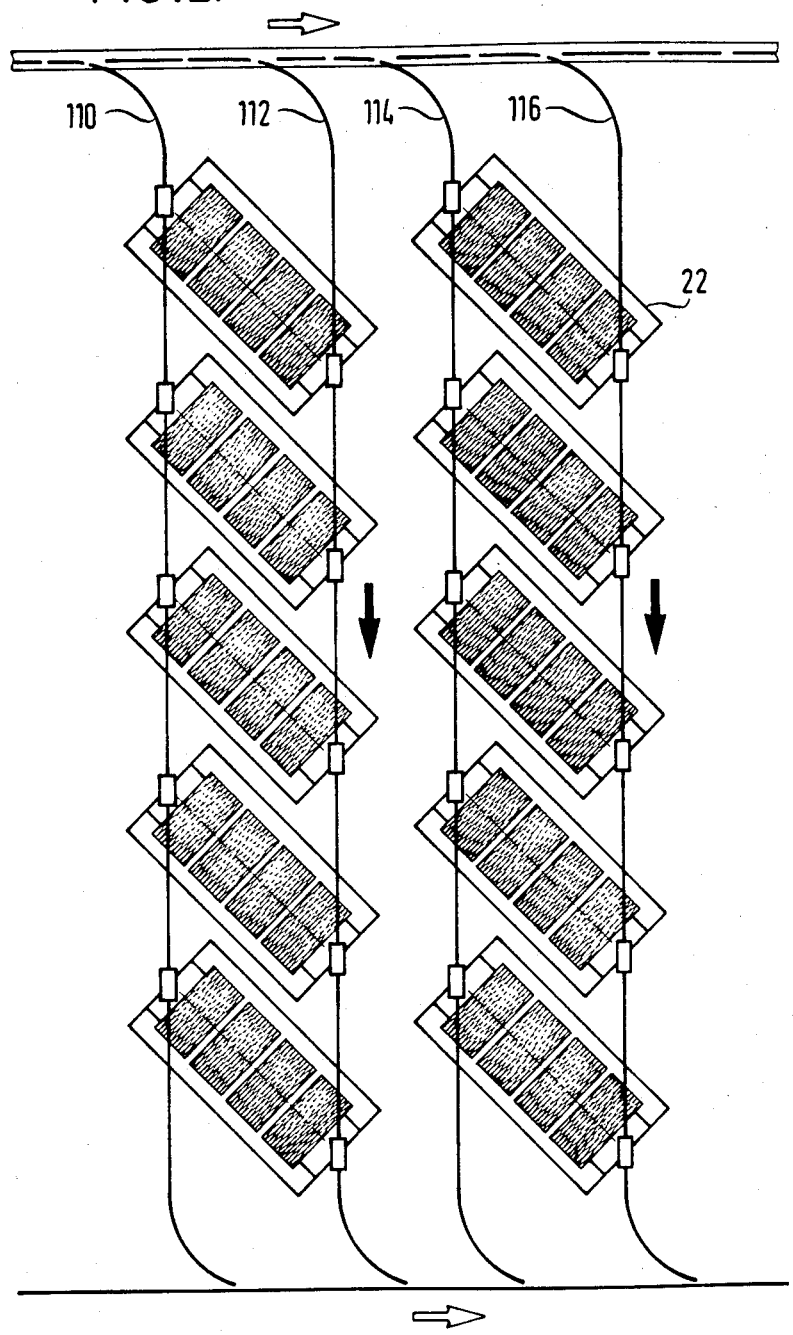
FIG. 21 is a corresponding representation of another storage station.

According to FIG. 20, the conveyor carriers can be diverted from a rail 18 on to branching-off storage rails 104, 106, 108, so that an intermediate store or buffer for bobbins is formed in this way. In the example illustrated in FIG. 20, the conveyor carriers 22 run in the usual way into the storage rails 104, 106, 108 arranged parallel and next to one another, whereas according to FIG. 21 the front and rear rollers of the conveyor carriers 22 move into different parallel storage rails 110, 112, 114, 116 and are consequently in a diagonally offset position which is illustrated in a plan view in FIG. 21 and by means of which, under certain circumstances, a higher storage capacity can be achieved.

Figure 22:
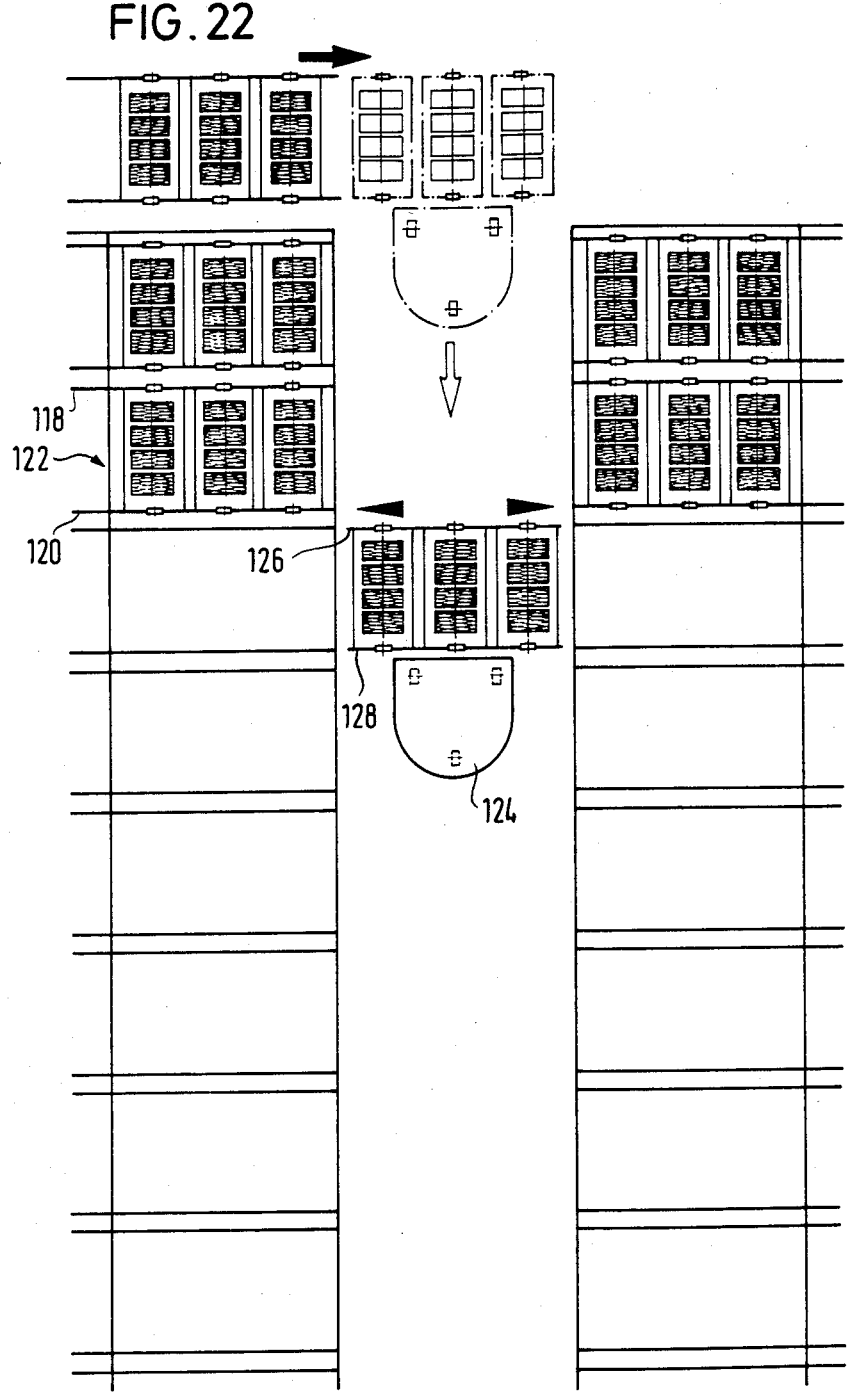
FIG. 22 shows a plan view of an embodiment of a bobbin store.
Figure 23:
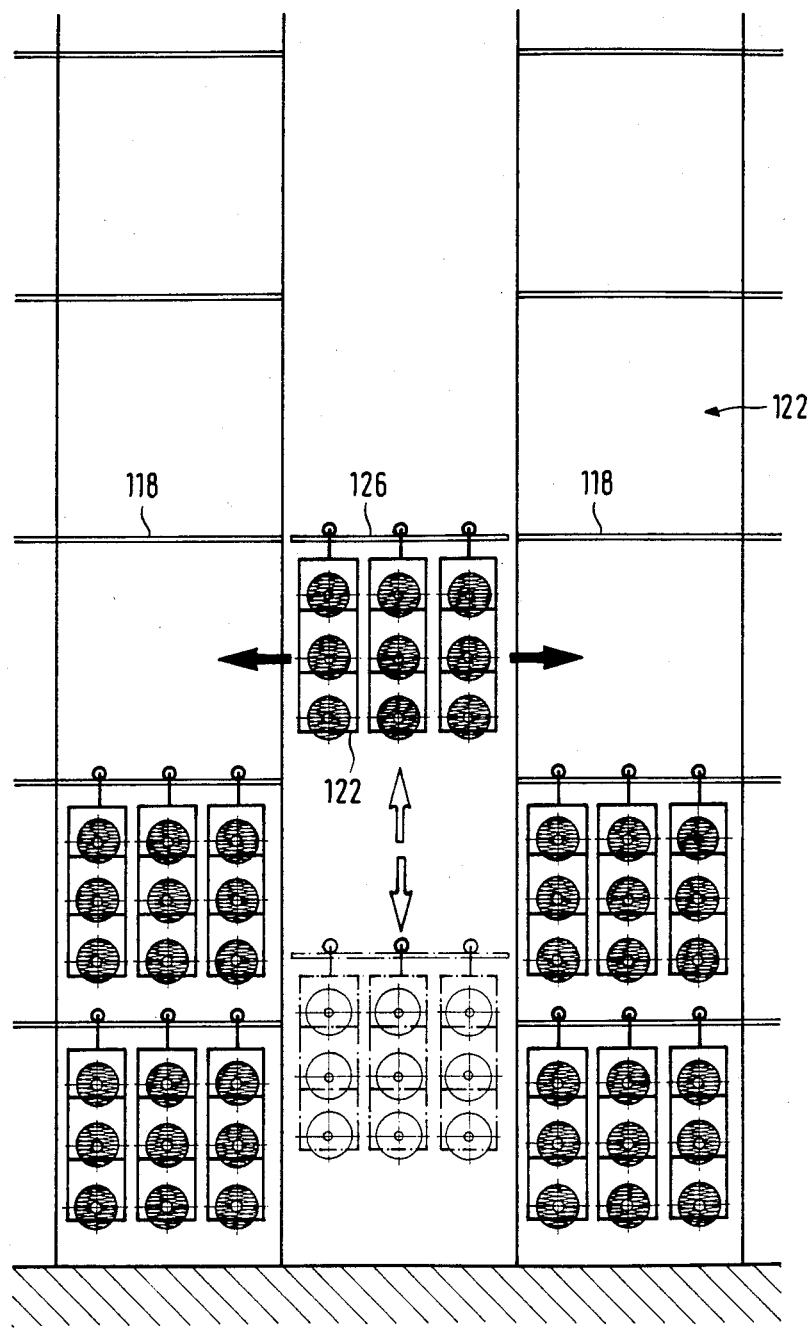
FIG. 23 is an associated side view.
Figure 24:
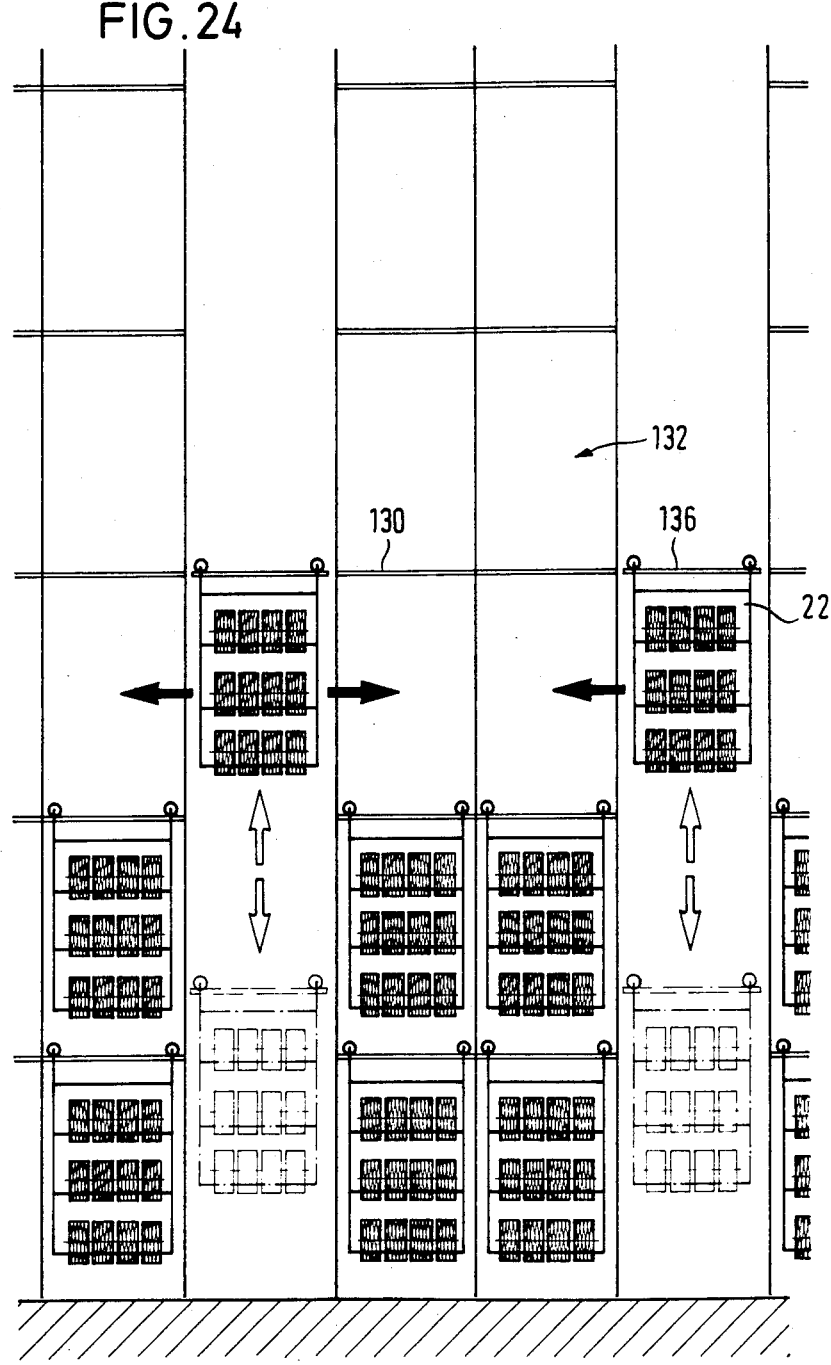
FIG. 24 shows a plan view of another embodiment of a bobbin store.
Figure 25:
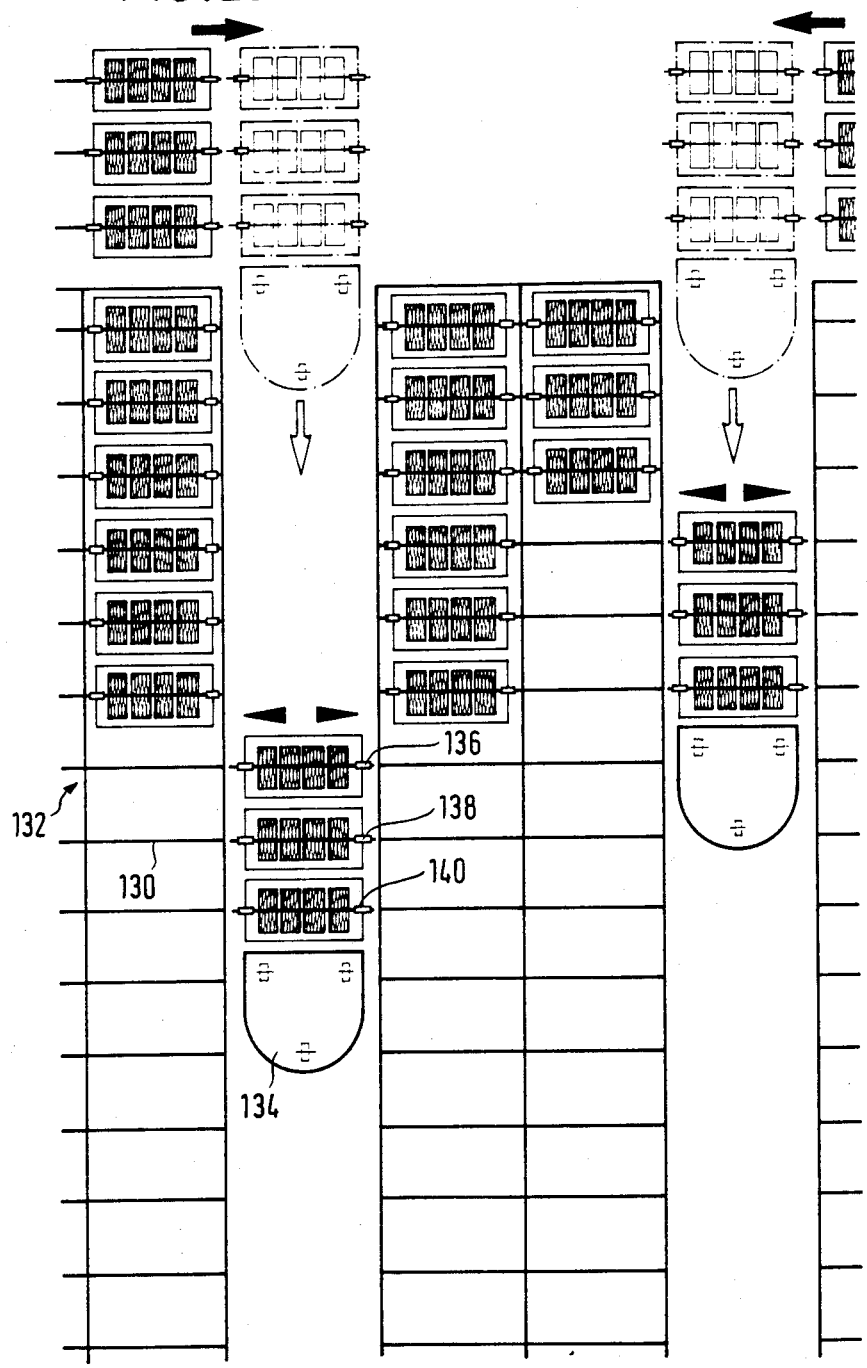
FIG. 25 is an associated side view.

FIGS. 22 and 23 illustrate a shelf-like store for conveyor carriers which are filled with bobbins and which, in this case, can be moved by means of transverse front and rear rollers onto parallel rails 118, 120 of individual shelf compartments 122. This storage method presupposes that the rollers of the conveyor carriers 22 are rotatable about vertical axes. To introduce the conveyor carriers 22 into the shelf compartments 122, carriages 124 can be provided with an appropriate liftable and lowerable retention device having two rails 126, 128. This can be, for example, an appropriately converted fork-lift truck. FIGS. 24 and 25 show a similar solution, but here the conveyor carriers 22 run in their usual direction of travel on rails 130 in the individual shelf compartments 132. Carriages 134 have a retention device with a number of rails 136, 138, 140, each intended for receiving a conveyor carrier 22.

It emerges from the foregoing description that the invention provides, by means of relatively few standard elements, a modular system which can be used to perform all the tasks of receiving, transporting, transferring and storing bobbins. Because of the possibility of receiving several bobbins simultaneously during their removal from yarn-producing machines, and because it is possible to transfer several bobbins continuously over the entire system, a high working speed of the system is obtained. The entire process cycle is largely automated. Because the work steps of collecting the bobbins on an automatic spinning machine, transferring them to the transfer chute and passing them on to the conveyor carriers overlap one another in time, delays in removal are avoided.

The bobbins are readily accessible in the conveyor carriers from both sides for the use of handling appliances or for manual removal or loading. Interaction with existing handling and/or robot equipment, monitoring devices and automatic packaging machines or with those which are restricted to a specific intended use is therefore directly possible.

I claim:

1. Apparatus for transporting and storing bobbins, said apparatus comprising:
   (a) a plurality of conveyor belts sized, shaped, and positioned to transport bobbins;
   (b) a plurality of inclined collecting chutes, each one of said plurality of inclined collecting chutes being associated with one of said plurality of conveyor belts and being sized, shaped, and positioned to receive and store bobbins from the associated one of said plurality of conveyor belts and to store a plurality of the bobbins;
   (c) a plurality of movable stands movable on a first rail system located adjacent to said plurality of inclined collecting chutes;
   (d) a plurality of pivotably mounted transfer chutes, each one of said plurality of pivotably mounted transfer chutes being mounted on an associated one of said plurality of movable stands, being vertically movable relative to the associated one of said plurality of movable stands, and being sized and shaped to receive and store a plurality of bobbins from the associated one of said plurality of inclined collecting chutes, each one of said plurality of pivotably mounted transfer chutes being pivotable from a first position in which it is positioned to receive bobbins from a temporarily associated one of said plurality of inclined collecting chutes to a second position;
   (e) a plurality of first means for transferring bobbins, each one of said plurality of first means being associated with one said plurality of inclined collecting chutes and being adapted to transfer a plurality of bobbins from the associated one of said plurality of inclined collecting chutes to a temporarily associated one of said plurality of pivotably mounted transfer chutes when the temporarily associated one of said plurality of pivotably mounted transfer chutes is in its first position;
   (f) a plurality of movable conveyor carriers movable on a second rail system, each one of said plurality of movable conveyor carriers having a plurality of vertically spaced chute portions each of which is sized, shaped, and positioned to receive and store a plurality of bobbins, said second rail system and said plurality of movable conveyor carriers being sized, shaped, and positioned so that each one of said plurality of movable conveyor carriers can be brought into position next to a selected one of said plurality of vertically spaced chute portions in a temporarily associated one of said plurality of pivotably mounted transfer chutes when it is in its second position; and
   (g) a plurality of second means for transferring bobbins, each one of said plurality of second means being associated with one of said plurality of pivotably mounted transfer chutes and being adapted to transfer a plurality of bobbins from the associated one of said plurality of pivotably mounted transfer chutes to a temporarily associated one of said plurality of vertically spaced chute portions on a temporarily associated one of said plurality of movable conveyor carriers when the associated one of said plurality of pivotably mounted transfer chutes is in its second position.

2. Apparatus as recited in claim 1 wherein each one of said plurality of inclined collecting chutes is pivotable into a horizontal position.

3. Apparatus as recited in claim 1 wherein each one of said plurality of pivotably mounted transfer chutes is pivotable about a vertical axis between its first and second positions.

4. Apparatus as recited in claim 1 wherein said second means comprise a plurality of horizontal axles, each one of said plurality of transfer chutes being mounted on and tiltable about a corresponding one of said plurality of horizontal axles.

5. Apparatus as recited in claim 1 wherein each one of said plurality of movable conveyor carriers is pivotable relative to said first rail system about a vertical axis.

6. Apparatus as recited in claim 1 wherein each one of said plurality of movable conveyor carriers comprises:
   (a) a frame comprising a plurality of vertical struts and a plurality of normally horizontal struts pivotably attached to corresponding ones of said plurality of vertical struts and
   (b) a plurality of roller-holders operatively associated with said second rail system and pivotably attached to corresponding ones of said plurality of vertical struts,
   whereby, on a non-horizontal portion of said second rail system, said plurality of normally horizontal struts pivot relative to said plurality of vertical struts and cease to be horizontal.

7. Apparatus as recited in claim 6 wherein each one of said plurality of movable conveyor carriers further comprises a plurality of adjustable retaining plates, one of said plurality of adjustable retaining plates being located at each end of each one of said plurality of vertically spaced chute portions.

8. Apparatus as recited in claim 1 wherein each one of said plurality of chute portions is formed by spaced lateral rods and a flexible material arranged to sag between said spaced lateral rods.

* * * * *